United States Patent [19]

MacHattie et al.

[11] 4,156,362
[45] May 29, 1979

[54] WINDCHILL INDICATOR

[75] Inventors: Lloyd E. MacHattie, Willowdale; Lorne A. Kuehn, Downsview, both of Canada

[73] Assignee: Her Majesty the Queen in right of Canada, Canada

[21] Appl. No.: 939,800

[22] Filed: Sep. 5, 1978

[30] Foreign Application Priority Data

Nov. 4, 1977 [CA] Canada ................................. 290178

[51] Int. Cl.² ............................................. G01W 1/06
[52] U.S. Cl. ..................................... 73/170 R; 73/344
[58] Field of Search ................... 73/170 R, 339 C, 344

[56] References Cited

U.S. PATENT DOCUMENTS

| | | | |
|---|---|---|---|
| 2,614,428 | 10/1952 | Braun | 73/338.3 |
| 3,753,371 | 8/1973 | Anderson | 73/344 |
| 4,091,667 | 5/1978 | Anderson | 73/170 R |

*Primary Examiner*—S. Clement Swisher
*Attorney, Agent, or Firm*—Stevens, Davis, Miller & Mosher

[57] ABSTRACT

A portable measuring device to provide a readout representing an equivalent windchill temperature or heat loss from exposed flesh in cold moving air. The device comprises a body having a channel through which moving air is conducted. A pair of oppositely disposed walls are part of the channel, and at least one of these walls is at least partially transparent. A windvane is disposed in the channel for deflection by the air moving through it. The windvane is supported from the body of the measuring device for pivotal movement. A thermometer is also supported from said body, and has graduations thereon to provide a measurement of the air temperature. Chart means are also provided on the body visible through one of said walls. First, second and third series of markings are on the chart means. At least a portion of the first markings is in alignment with the graduations of the thermometer. A portion of an other of the series of markings is oriented to be in alignment with the windvane upon deflection thereof. The one and other series of markings are arranged to provide an intersection thereof readable against the remaining markings, thereby to yield from the latter said readout, selectively, of the windchill temperature and heat loss. The body is preferably tubular in cross-section with the chart means being formed as printed matter on an interior face of at least one of the partially transparent walls, and has separate support means for mounting both the windvane in the channel and the thermometer immediately adjacent the latter.

10 Claims, 4 Drawing Figures

U.S. Patent
May 29, 1979
4,156,362
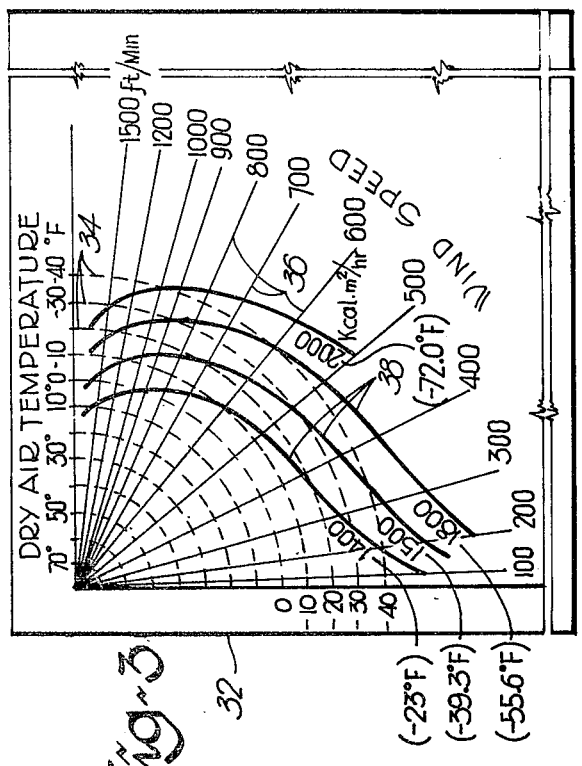
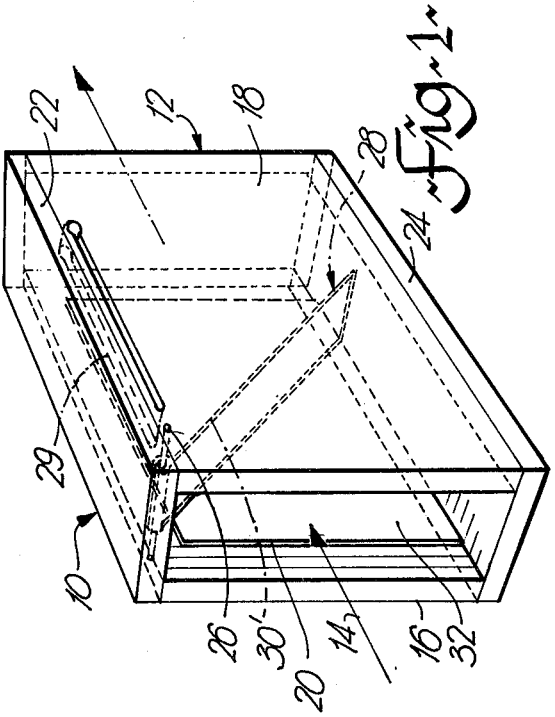
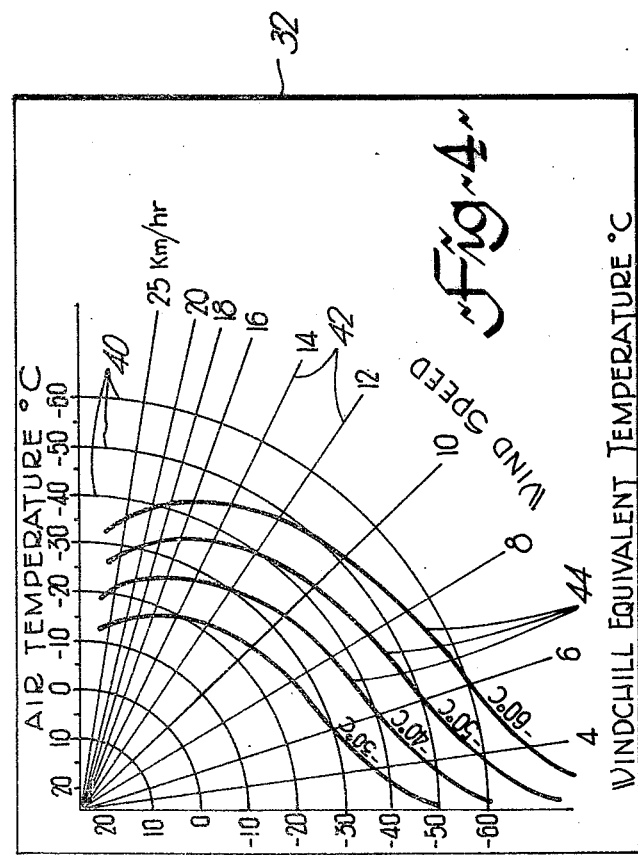
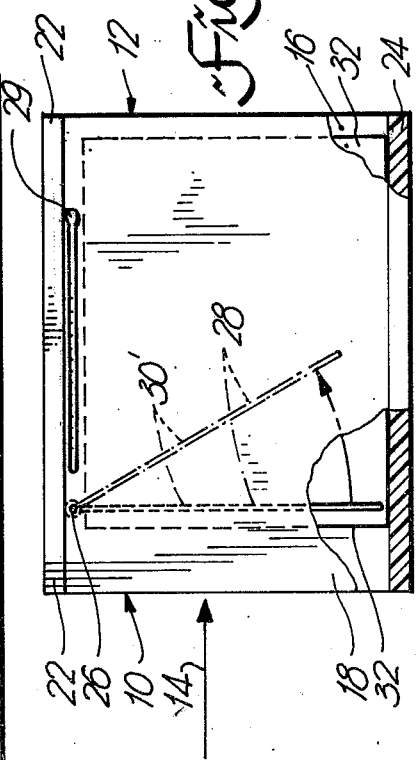

WINDCHILL INDICATOR

This invention relates generally to a measuring device, and more particularly, to a device for measuring temperature and heat loss parameters arising from windchill.

BACKGROUND OF THE INVENTION

A parameter known as the Siple Windchill Index has become relatively popular in determining cold stress experienced by persons in cold, windy air environments. This is especially so in winter. Convective heat loss, for example, as experienced by persons in a cold air environment is not just a function of the air temperature. The wind speed in that environment is also an important consideration.

The windchill index as determined from measurements of wind and dry bulb air temperature provides either (a) the still air temperature equivalent in cold stress, to that produced by the measured temperature and wind combination; or (b) the convective heat loss from exposed human flesh caused by the particular combination of wind and air temperature. Both of these indices are useful. They can be used to gauge an anticipated time of exposure before dire physiological events occur, such as frostbite of exposed flesh.

At present, for example, the windchill index is usually determined by taking at least three separate actions. Two are measurements of meteorological phenomena, namely, wind speed and air temperature. These two measurements are made with different instruments. With these measurements, a chart or nomogram must be consulted to determine the windchill value.

These multiple actions are unnecessarily long and complicated processes. Further, they can be subject to error. This danger or risk arises because the measurements of conditions must be manipulated mentally through a number of steps, to arrive at a windchill value. The calculation occurring at each step carries a possibility for error with it.

The present invention is expected to overcome many of the shortcomings mentioned above. This invention provides a device which is simple to use. Further, it minimizes the separate steps which need to be taken and thus reduces the risk of introducing errors. Thus a user of this invention can simply and reliably obtain measurements of equivalent windchill temperature and heat loss.

Accordingly, there is provided by this invention a portable measuring device to provide a readout representing an equivalent windchill temperature or heat loss in cold moving air; said device comprising; a body having walls therein to define a channel through which moving air is conducted, an oppositely disposed pair of such walls being at least partially transparent; a windvane disposed in said channel for deflection by said air moving therethrough, said windvane being pivotally supported from said body; a thermometer also supported from said body, and having graduations thereon to provide a measurement of temperature of said air; and chart means supported by said body, visible through one of said transparent walls, said chart means including first, second, and third series of markings thereon, at least a portion of one of said series of markings being in alignment with the graduations on said thermometer, and at least a portion of an other of said markings being oriented to be in alignment with the windvane upon deflection thereof, the one and other series of markings being arranged to provide an intersection thereof readable against the remaining series of markings, thereby to yield from said remaining series of markings said readout, selectively, of the windchill temperature and heat loss.

These and other features and advantages of this invention will become apparent from the detailed description below.

BRIEF DESCRIPTION OF THE DRAWINGS

That description is to be read in relation to the accompanying drawings, in which:

FIG. 1 is an elevation view of one preferred embodiment of this invention, taken in perspective to illustrate certain features of the same;

FIG. 2 is a side view, taken in elevation and showing further details of the embodiment of FIG. 1;

FIG. 3 is a graphical representation of a chart showing heat loss, and positionable interiorily of the device of FIG. 1 and FIG. 4 is also a graphical representation of a chart showing equivalent windchill temperatures and positionable within the device of FIG. 1.

DETAILED DESCRIPTION OF THE PREFERRED EMBODIMENT

A measuring device embodying this invention is shown overall in FIG. 1 at 10. This device 10 comprises a body 12, preferably tubular in cross-section, as taken perpendicular to a wind direction shown by arrow 14. The body 12 thus includes walls 16 and 18 which are spaced apart to form a channel 20, through which moving air can pass. This occurs when the device 10 is hand held so as to position the channel 20 facing the wind, ie generally parallel to it.

The channel 20 is further delimited by walls 22 and 24. The walls 16, 18, 22 and 24 of FIG. 1 consists of plates or strips of a polymeric material, such as polyethylene, nylon, "Plexiglass" (a trade name) or other such material in stiff sheet or plate form. These walls 16, 18, 22 and 24 are shown as being separate pieces, connected together as by an adhesive, or by thermal bonding. Such walls 16, 18, 22 and 24 could alternatively be extruded, making the body 12 an integral, tubular entity. At least one of the walls 16 and 18 is at least partially transparent for reasons to become clear shortly. The walls 22 and 24 can be either transparent or opaque.

The walls 16 and 18 are formed with suitable apertures which serve respectively to support opposite ends of a hinge pin 26. This pin 26 supports a windvane 28 for pivoted movement about an axis coaxial with pin 26 in this instance. Hinge pin 26 is supported from the body 12 along side an edge portion of the channel 20. In this way, the windvane 28 is positioned in the channel 20, to be deflected by air moving through said channel 20.

The hinge pin 26 is a piece of drill rod. It can also be in the form of a needle bearing or other rod or pin like material, and is mounted so as to be subject to a minimal amount of friction. The windvane 28 is a thin flat strip of metal such as aluminum. The edges of windvane 28 are built up slightly, as by folding over a small strip thereof. This arrangement strengthens the windvane 28 against bending, due to the air moving past it.

The windvane 28 has two longitudinal edges 30 and 30' which are spaced slightly from the interior faces of walls 16 and 18. Deflection of the windvane 28 due to air moving through the channel 20 will thus be visible through the transparent wall(s) 16 or 18. The equation of the general form $\tan\theta = \text{constant} \cdot V^n$ where $\theta$ = the angle in degrees from the vertical of the deflected vane, and V = wind velocity in km/hr and n is approx. 2, is satisfied quite reasonably over the range 0–16 km/hr.

A thermometer 29 is also carried on a retainer bracket (not shown) an adhesive, or the like on the body 12 of measuring device 10. This thermometer is conveniently positioned immediately adjacent the channel 20 and measures the temperature of air moving past it. Usually, the thermometer 29 is placed parallel to the flow of air through channel 20. The thermometer 29 has graduations thereon, representing either °C. or °F., as desired. Further, windchill and heat loss are factors associated with low temperatures. Thus the scale of thermometer 29 could extend, for instance, over a range of say −60° C. to 0° C. instead of the more conventional ranges of say −50° C. to +40° C. In the former case an expansion bulb at the top end of the thermometer for the liquid therein would be needed to allow storage etc. of the thermometer at room or summer temperatures.

Chart means 32, shown by the dotted lines in FIG. 2 are also mounted on the body 12 of measuring device 10. The chart means 32 are conveniently mounted in channel 20 adjacent an interior face of one of the transparent walls 16 or 18. One face of the chart means is illustrated in FIG. 3 as a graph-like presentation of three series of markings 34, 36, 38. The opposite face of chart means 32 is conveniently provided with another graph-like presentation of three series of markings 40, 42 and 44, seen in FIG. 4.

The first series of markings 34 and 40 are graduations representing the temperature of the moving air. These markings are positioned in alignment with the graduations on thermometer 29. A second series of markings 36 and 42 represent the wind velocity. In the embodiment of FIG. 3, the markings 34 are a series of curved lines spaced equally apart and representing, optionally, the air temperature in °C. or °F. The markings 36 are straight lines, emanating radially from a point coincident with the pivotal axis of pin 26. The position of lines 36 is provided by calibrating the deflection of a windvane 28 of a given size and weight against air moving at a known velocity. In FIG. 3 the markings 38 are curved lines representing heat loss from exposed flesh, measured in kilocalaries per square meter per hour (hcal/m²/hr.) The temperature and windspeed is determined at a glance from markings 34 and 36, and these markings can be seen from FIG. 3 to provide an intersection thereof measurable against the series of markings 38. The intersection of markings 34 and 36 is thus easily and quickly read off the series of markings 38 to yield the heat loss from exposed flesh.

The human body has a fairly limited capacity to deliver heat via the blood stream to specific areas of the body such as the face or hands, that are exposed to the air. If that air is moving and is very cold, then the heat lost to that air by convection may be beyond the body's capacity to replenish it. Thus, dire physiological consequences such as frostbite, will occur within a predictable time frame.

Accordingly, the heat loss figure derived from markings 38, noted above, will quickly tell whether persons in that environment will be subject to a risk, or certainty, of incurring frostbite. The person can then act appropriately, either going indoors immediately, or proceeding very cautiously.

It is emphasized that although the thermometer 29 and markings 34 must be in alignment, their specific orientation relative to the channel 20, for example, is of little importance. It is merely convenient to position thermometer 29 either parallel to, or perpendicular to that channel 20. Clearly, thermometer 29 should not interfere with the deflection of windvane 28, either directly as an obstruction, or indirectly by altering the pattern of flow of air moving through the channel 20. As yet another alternative, the thermometer 20 could be positioned on an exterior face of one of the walls 16 or 18.

The embodiment of FIGS. 1 and 2 represents a simple, easy to read measuring device. A user can simply hold the device 10 in hand, have the wind blow through channel 20, and using the air temperature and wind speed markings, quickly extract the equivalent windchill temperature from the markings 44 in the chart means of FIG. 4, or the heat loss from markings 38 of FIG. 3, or both.

Several modifications will be possible within the scope of this invention. Normally, the device 10 will be about the size of a package of cigarettes, i.e. pocket-size. It will also be rectangular in plan and cross-section. As an alternative, however, walls 16 and 18 could be circular discs, with caps or walls 22 and 24 each being a segment of a thicker disc of the same diameter. In a similar manner chart means 32 can be a single semi- or wholly transparent plate with the markings 34, 36, 38 on one face and markings 40, 42 and 44 on the opposite face. As a further modification such charts could be on one face of two separate sheets, with such separate sheets being mounted in very close proximity to one another, i.e., back to back, or respectively adjacent opposite walls 16 and 18.

Further yet, chart means 32 could be applied directly to one face of either of walls 16 or 18, for instance, as a decal as markings on such walls, or as interchangeable inserts. It is expected that for ease of manufacture and user readability, the chart means 32 will normally be applied as printing onto the interior face of walls 16 and 18. The representation of FIG. 3 would be on one wall, say 16 and the representation of FIG. 4 would be on the other wall. The reinforced edges of windvane 28 could have a coating of a highly visible, say, fluorescent material on it to promote easy visibility.

The windvane 28 could also be modified. It could possibly be in the form of a screw or propellor-like structure. Such an arrangement would function in a manner similar to that of a mechanical governor to provide a readout of wind velocity or speed from markings arranged as a series of concentric circles. In such instances, the rotation of the windvane would cause a portion thereof to extend radially outwardly due to centrifugal forces generated by that rotation. The radial extension would be calibrated, again to yield a wind speed for the moving air, i.e., air moving through channel 20.

The foregoing describes a preferred embodiment of this invention. It has also indicated a number of modifications and alternatives. These and other changes that will be apparent to those knowledgeable in this art are intended to be encompassed by this invention, as defined in the claims below.

We claim:

1. A portable measuring device to provide a readout representing an equivalent windchill temperature or heat loss in cold moving air; said device comprising:

a body having walls therein to define a channel through which moving air is conducted, an oppositely disposed pair of such walls being at least partially transparent;

a windvane disposed in said channel for deflection by said air moving therethrough, said windvane being pivotally supported from said body;

a thermometer also supported from said body, and having graduations thereon to provide a measurement of temperature of said air; and chart means supported by said body, visible through one of said transparent walls, said chart means including first, second, and third series of markings thereon, at least a portion of one of said series of markings being in alignment with the graduations on said thermometer, and at least a portion of another of said markings being oriented to be in alignment with the windvane upon deflection thereof, the one and other series of markings being arranged to provide an intersection thereof readable against, the remaining series of markings, thereby to yield from said remaining series of markings said readout, selectively, of the windchill temperature and heat loss.

2. The measuring device defined in claim 1, wherein said series of markings comprises in each instance a series of lines.

3. The measuring device defined in claim 1, wherein at least one of said thermometer and chart means is positioned in said channel in a manner not obstructing deflection of the windvane due to said air moving through said channel.

4. The measuring device defined in one of claims 1, 2 or 3, wherein said body comprises a tubular member having at least two opposing walls which form a part of said channel, these two opposing walls being at least partially transparent.

5. The measuring device defined in one of claims 1, 2 or 3 wherein said chart means comprises a planar element having opposed faces, one such face having markings thereon representative of the windchill temperatures, the other of said faces having markings thereon representative of heat loss, such that the desired readouts are obtainable from opposite directions.

6. The measuring device defined in one of claims 1, 2 or 3, wherein said windvane is a thin generally planar strip of metal, having mounting means adjacent a peripheral portion thereof, said windvane thereby being pivotally moveable about an axis parallel to the plane of said strip of metal.

7. A portable measuring device to provide a readout representing an equivalent windchill temperature or heat loss in cold moving air; said device comprising;

a body formed with a tubular channel therein through which the moving air is conducted, said channel including an oppositely disposed pair of walls that are at least partially transparent;

a windvane supported for pivotal movement from said body, the windvane being positioned in said channel for movement thereof by said air moving through the channel, said windvane being visible through said oppositely disposed pair of walls;

a thermometer supported from said body and having graduations thereon to provide a measurement of temperature of said air; and chart means supported by said body and positioned thereon to be visible through said partially transparent pair of walls, the chart means having first, second, and third series of markings thereon, one of the series of markings being in alignment with said graduations on the thermometer, and an other of said series of markings being oriented to be in alignment with the windvane upon movement thereof, said one and other series of markings being arranged to provide an intersection thereof readable against the remaining series of markings, thereby to yield from said remaining series of markings said readout, selectively, of the windchill temperature and heat loss.

8. The measuring device defined in claim 7, wherein said windvane comprises a flat, thin strip of metal, and said other series of markings comprises straight lines extending radially from a point coincident with the pivot point of said windvane, each straight line representing a velocity figure for the moving air.

9. The measuring device defined in claim 8, wherein said chart means comprises a flat plate supported against one of said partially transparent walls, whereby the markings on the chart means are visible through either of the partially transparent walls.

10. The measuring device defined in one of claims 7, 8 or 9, wherein said chart means comprises a flat plate having opposite faces, one of said faces having markings thereon representing windchill temperature, and the other face having markings representing heat loss.

* * * * *

UNITED STATES PATENT AND TRADEMARK OFFICE
CERTIFICATE OF CORRECTION

PATENT NO. : 4,156,362
DATED : May 29, 1979
INVENTOR(S) : Lloyd E. MacHattie and Lorne A. Kuehn It is certified that error appears in the above-identified patent and that said Letters Patent are hereby corrected as shown below:

In Figure 1, the rear edge of the wind vane should be designated by reference numeral 30 (see Column 2, line 65).

Column 3, line 48 should read --($Kcal/m^2 hr$). The temperature and windspeed is deter- --.

Signed and Sealed this

*Twenty-ninth* Day of *April 1980*

[SEAL]

*Attest:*

SIDNEY A. DIAMOND

*Attesting Officer*  *Commissioner of Patents and Trademarks*